United States Patent [19]

Riedel et al.

[11] 4,140,033
[45] Feb. 20, 1979

[54] PEELING APPARATUS

[75] Inventors: Franz Riedel; Joachim Bertenburg, both of Solingen, Fed. Rep. of Germany

[73] Assignee: Th. Kieserling & Albrecht, Solingen, Fed. Rep. of Germany

[21] Appl. No.: 754,322

[22] Filed: Dec. 27, 1976

[30] Foreign Application Priority Data

Dec. 31, 1975 [DE] Fed. Rep. of Germany ....... 2559338

[51] Int. Cl.² ............................................. B23B 5/12
[52] U.S. Cl. ..................................................... 82/20
[58] Field of Search .............................................. 82/20

[56] References Cited

U.S. PATENT DOCUMENTS

| | | | |
|---|---|---|---|
| 2,288,578 | 6/1942 | Yeomans et al. | 82/20 |
| 3,059,514 | 10/1962 | Lindemann | 82/20 |

FOREIGN PATENT DOCUMENTS 578874  7/1959  Canada ......................................... 82/20

Primary Examiner—Leonidas Vlachos
Attorney, Agent, or Firm—Edward E. Sachs

[57] ABSTRACT

Peeling apparatus includes opposite clamping devices engageable with opposite ends of a workpiece for carrying same longitudinally through a cutter head. Support bearings for the clamping devices are located on opposite sides of the cutter head, and are longitudinally movable for maintaining same as close as possible to the workpiece end faces. This minimizes the length of the clamping devices between the support bearings and the workpiece end faces, and thereby reduces vibrations. The support bearings include hydrostatic support devices transversely engaging the clamping devices to minimize vibration by eliminating transverse play between the parts.

15 Claims, 6 Drawing Figures

PEELING APPARATUS

The invention relates generally to peeling apparatus and, more particularly, to peeling apparatus of the type including opposite clamping devices engageable with opposite ends of a workpiece for carrying same through a cutter head.

Peeling apparatus of the type described is commonly used with relatively short cylindrical metal workpieces because workpieces can only be firmly clamped on their end faces and moved axially through a cutter head. An arrangement of this type requires clamping devices capable of projecting through the cutter head. In order to pass the workpiece completely through the cutter head from one side thereof to the other, the support bearings for the clamping devices must be spaced a substantial distance from the cutter head. This results in a substantial length of clamping device extending between its support bearing and the end face of the workpiece. This cantilevered effect of the clamping devices beyond their support bearings causes relatively severe vibrations as the workpiece travels through the cutter head.

Any transverse looseness or play between the clamping devices and their support bearings also contributes to vibration as the workpiece is fed through the cutter head. It would be desirable to have an arrangement for eliminating transverse play between the clamping devices and their support bearings, while allowing longitudinal movement of the clamping devices relative to their support bearings.

It is therefore the primary object of the present invention to provide a peeling apparatus for working relatively short workpieces in which vibrations are minimized.

It is a further object of the present invention to provide a peeling apparatus wherein vibrations are minimized by having movable support bearings for opposite clamping devices.

It is also an object of the present invention to provide a peeling apparatus having an improved transverse hydrostatic clamping or support mounting arrangement between the support bearings and the clamping devices.

An aspect of the present invention resides in providing a peeling apparatus with longitudinally movable bearings for the opposite clamping devices. Actuating means for the support bearings maintains such bearings as close as possible to the end faces of the workpiece at all times during passage of the workpiece through the apparatus in order to minimize the length of a clamping device which projects or overhangs beyond its support bearing.

In accordance with one arrangement, an infeed support bearing follows the workpiece as it enters the cutter head and as it begins passing therethrough. When the trailing end of the workpiece approaches the cutter head, the infeed support bearing stops and remains stationary for the remainder of the peeling operation. The output support bearing remains stationary while the workpiece is entering the cutter head and beginning to pass therethrough. When the leading end of the workpiece exits from the cutter head, the output support bearing begins to move longitudinally therewith until the workpiece has completely passed through the cutter head.

The support bearings are always located closely adjacent the ends of the workpiece except when the cutter head or apparatus housing prevents movement or location of the support bearings close to the workpiece ends. In general, it may be said that the infeed and output support bearings are respectively located closely adjacent the trailing and leading ends of the workpiece except when those ends are passing through the cutter head and its adjacent rollers.

With an arrangements of the type described, the workpiece and clamping devices are firmly supported against vibration by the improved support bearing arrangement of this application. The workpiece is firmly supported and damped against vibration in the plane of the cutter head, and in the vicinity of the workpiece end which emerges from the output guide rollers at the output side of the cutter head. The workpiece is held directly in front of and behind the workpiece guide rollers associated with the cutter head.

In accordance with one aspect of the present application, the support bearings guide the clamping devices and are themselves supported by the apparatus housing or by rails on a clamping carriage. The clamping devices form part of a longitudinally movable clamping carriage having elongated rails on which support bearings are preferably supported for longitudinal movement. The support bearings are longitudinally movable relative to the clamping devices and to the cutter head.

The actuating means for longitudinally moving the support bearings may be in the form of hydraulic cylinders carried by the clamping carriage for longitudinal movement therewith. By operation of these hydraulic cylinders, the location of the support bearings may be changed or predetermined at will.

Successful vibration damping in an apparatus of the type described requires relatively high accuracy or relatively firm engagement transversely between the support bearings and the clamping devices, and between the support bearings and the parts on which they are longitudinally slidably supported. In one arrangement, hydrostatic devices or support mountings are provided to maintain firm transverse engagement between the support bearings and the clamping devices. Such an arrangement allows the support bearings to assume a most favorable position in the vicinity of the cutter head during operation of the peeling apparatus.

The peeling apparatus may be considered an apparatus for performing work on workpieces, and the cutter head may be considered a work station at which work is performed on workpieces passing longitudinally therethrough. The clamping devices define opposed clamping means for clamping against opposite ends of a workpiece, and the clamping means is extendable through the work station for supporting and carrying a workpiece completely therethrough. The support bearings define support means located on opposite sides of the work station for supporting the opposed clamping means. The support means is selectively movable toward and away from the work station relative to the opposed clamping means. This arrangement maintains the support means as close as possible to the workpiece ends at all times and minimizes the length of the clamping means which extends between the support means and the workpiece ends.

For a better understanding of the present invention, together with other and further objects thereof, reference is had to the following description taken in connection with the accompanying drawings, and its scope will be pointed out in the appended claims.

Figure 1:
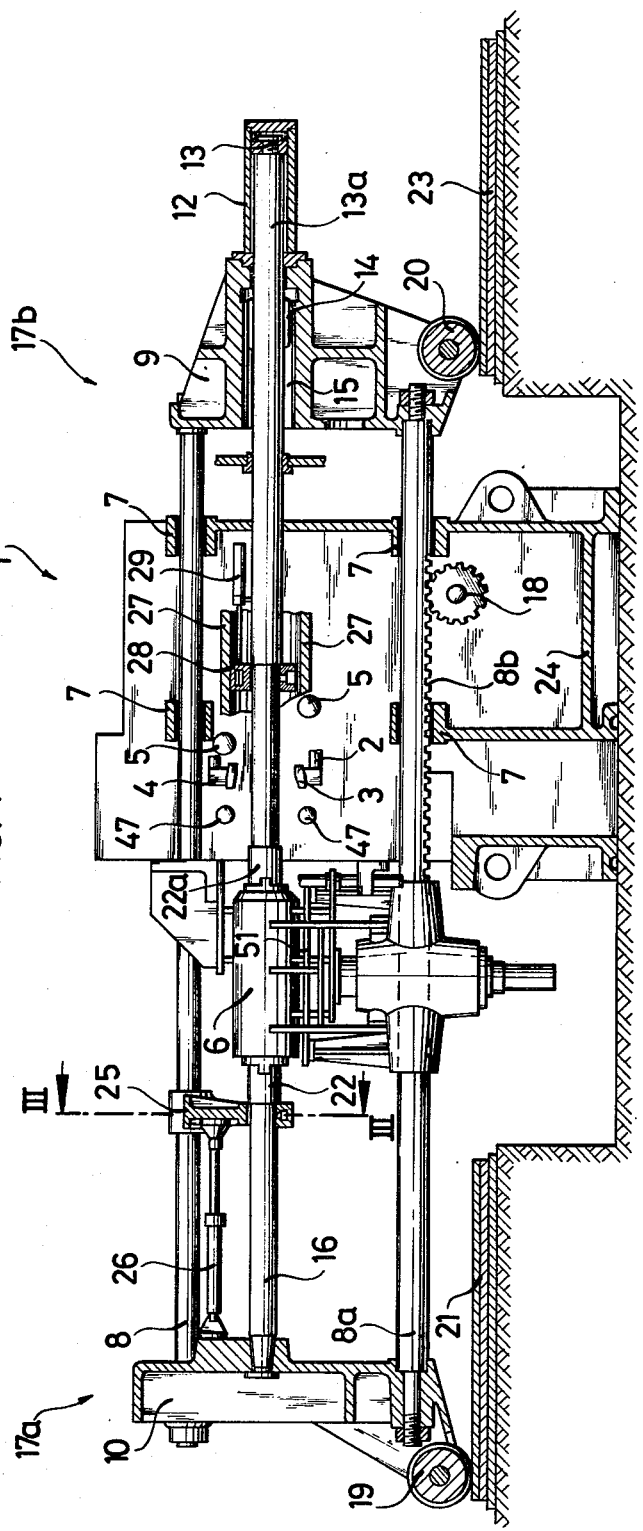
FIG. 1 is a cut-away side elevational view of a peeling apparatus having the improvements of the present application incorporated therein.

Referring now to the drawing, and particularly FIG. 1, there is shown a peeling apparatus 1 which includes a clamping carriage identified by numerals 17a and 17b. The clamping carriage encloses and passes through the apparatus 1. In one arrangement, the clamping carriage shown by numerals 17a and 17b includes end cross members 9 and 10 rigidly connected together by elongated rails 8 and 8a. The cross members 9 and 10 have bottom rollers 19 and 20 mounted thereon for displacement of the clamping carriage 17a, 17b relative to base plates 21 and 23.

The clamping carrige rails 8 and 8a are axially movable with the clamping carriage in guides 7 located in the vicinity of the plane of the cutter head in housing 24 of the peeling apparatus 1. Replaceable clamping pieces 22 and 22a clamp the end faces of a relatively short cylindrical metal workpiece 6. Clamping means for so clamping the workpiece 6 includes opposite clamping devices defined by a bar 16 and a piston rod 13a.

Figure 3:
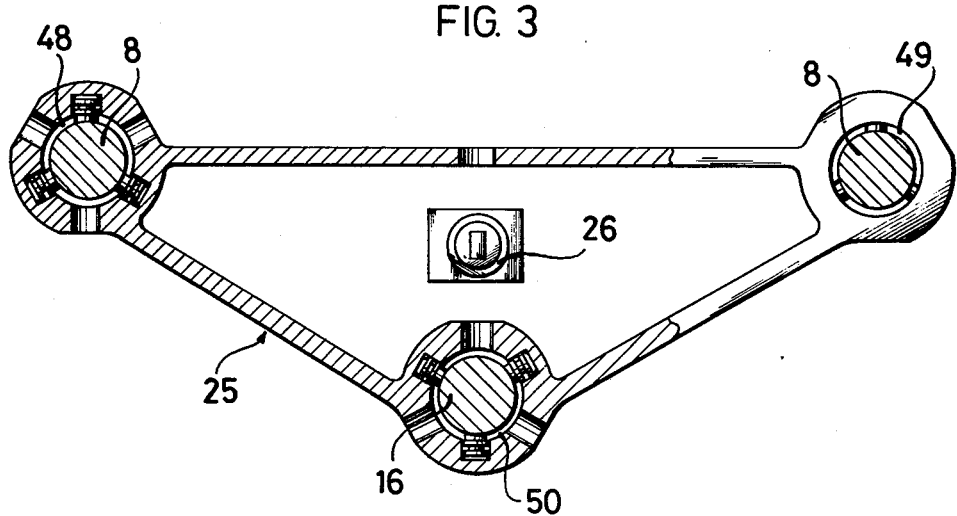
FIG. 3 is a cross-sectional elevational view taken generally on line III—III of FIG. 1.

As best shown in FIG. 3, a support bearing 25 effectively unites two adjacent clamping carriage rails 8 and clamping bar 16. Support bearing 25 is connected to the end cross member 10 of the clamping carriage by actuating means in the form of a hydraulic cylinder 26. The support bearing 25 is longitudinally movable back and forth relative to the rails 8 and the bar 16. This movement takes place in the direction of feed of the workpiece to be peeled, and may be considered toward and away from the cutter head of the peeling apparatus 1.

A supply and removal grid 51 places the workpiece 6 to be peeled between the opposite clamping devices defined by the clamping bar 16 and the piston rod 13a. Replaceable clamping pieces 22 and 22a are normally relatively short and can be of different lengths depending upon the lengths of the workpieces being processed. The supply and removal grid 51 removes a finished workpiece by moving same away from the plane of the drawing in FIG. 1.

The peeling apparatus 1 includes a housing 24 and a rotating cutter head 4 having a plurality of peeling blades or cutters 3 and being secured to a rotating hollow shaft 2 which is shown very schematically in the drawing. A support sleeve 27 is rigidly mounted to the housing 24 and projects into the rotating hollow shaft 2. Guide rollers 5 are mounted rotatably in the support sleeve 27 and are effective to center the non-rotating workpiece 6 as it moves axially forward. The guide rollers 5 and their centering action dampen the vibrations in the workpiece 6. Guide rollers 47 act in a manner similar to the guide rollers 5 and are arranged in front of the plane of the cutter head 4.

The elongated piston rod 13a projects longitudinally through the support sleeve 27 and the cutter head 4, and engages the leading end of the workpiece 6. FIG. 1 shows the workpiece 6 located on the grid 51 at the infeed side of the cutter head 4. The piston rod 13a is axially displaceable by operation of its piston 13 in cylinder 12 for movement thereof relative to the clamping carriage, and is also movable as a whole with the clamping carriage. Fin-like projections 14 are provided for guidance in axial slots 15 of end cross member 9 to guide the piston rod 13a and prevent rotation of same. The piston rod 13a is radially supported within the support sleeve 27 by a support bearing 28 which is longitudinally displaceable relative to the piston rod 13a and the support sleeve 27. Actuating means in the form of a hydraulic cylinder 29 is effectively mounted on the piston rod 13a, and engages the support bearing 28.

The clamping carriage as a whole is moved longitudinally back and forth by rotation of a pinion 18 mounted in the housing 24. The pinion 18 engages teeth 8b on the rail 8a.

Figure 4:
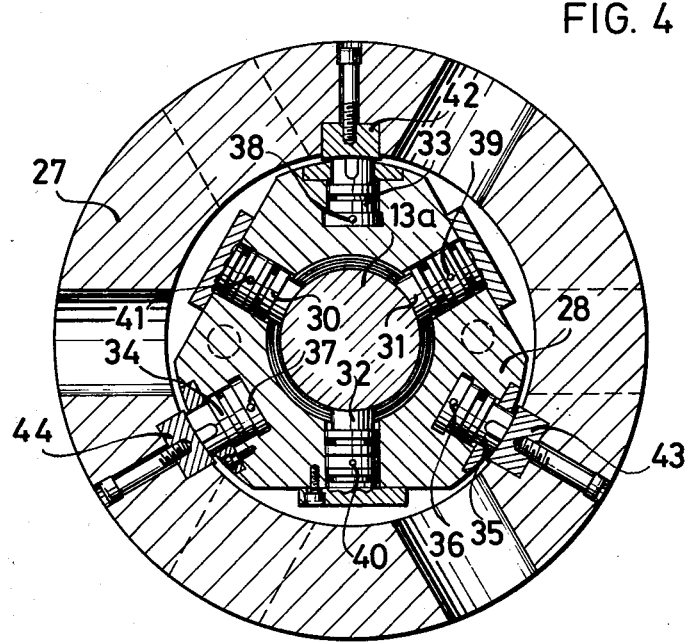
FIG. 4 is a cross-sectional elevational view of a support bearing at the output end of the peeling apparatus.

Hydrostatic devices are provided for mounting the support bearings 25 and 28. As shown in FIG. 4, the hydrostatic mounting support for the support bearing 28 includes six hydraulic cylinders having pistons 30, 31, 32, 33, 34 and 35 with small passages 36, 37, 38, 39, 40 and 41 through which hydraulic fluid can be fed. Any suitable arrangement may be provided for feeding hydraulic fluid through the piston passages including through a hollow piston rod for the cylinder 29. The pistons are constantly biased under hydraulic pressure and return of the hydraulic fluid is prevented by check valves in a known manner for each cylinder of the hydrostatic support mounting. The pistons 33, 34 and 35 slide in the support sleeve 27 upon gibbing or slideways 42, 43 and 44. The pistons 30, 31 and 32 slide upon the piston rod 13a. This transverse hydrostatic support mounting absorbs any vibrations between the support bearings and the clamping devices because there is no transverse play between the support bearings and the clamping devices, or between the support bearings and the elements on which they are longitudinally movably mounted.

The support bearing 25 is shown in FIG. 3 as having openings 48 and 49 receiving the rails 8, while the opening 50 receives the clamping bar 16. The bearing 25 is also connected so there is no transverse play between it and the rails 8 or the bar 16 in the same manner as described with respect to FIG. 4. That is, the hydrostatic support mountings described with respect to FIG. 4 are also provided in all of openings 48, 49 and 50 so there is no transverse play between the support bearing 25 and the rails 8 or the clamping bar 16. At the same time, longitudinal movement of the support bearings 25 and 28 can take place because the transverse force of engagement of the hydrostatic devices is not great enough to prevent longitudinal movement of the support bearings, or to prevent longitudinal movement of the clamping devices defined by the bar 16 and the piston rod 13a relative to the bearings.

Figure 2:
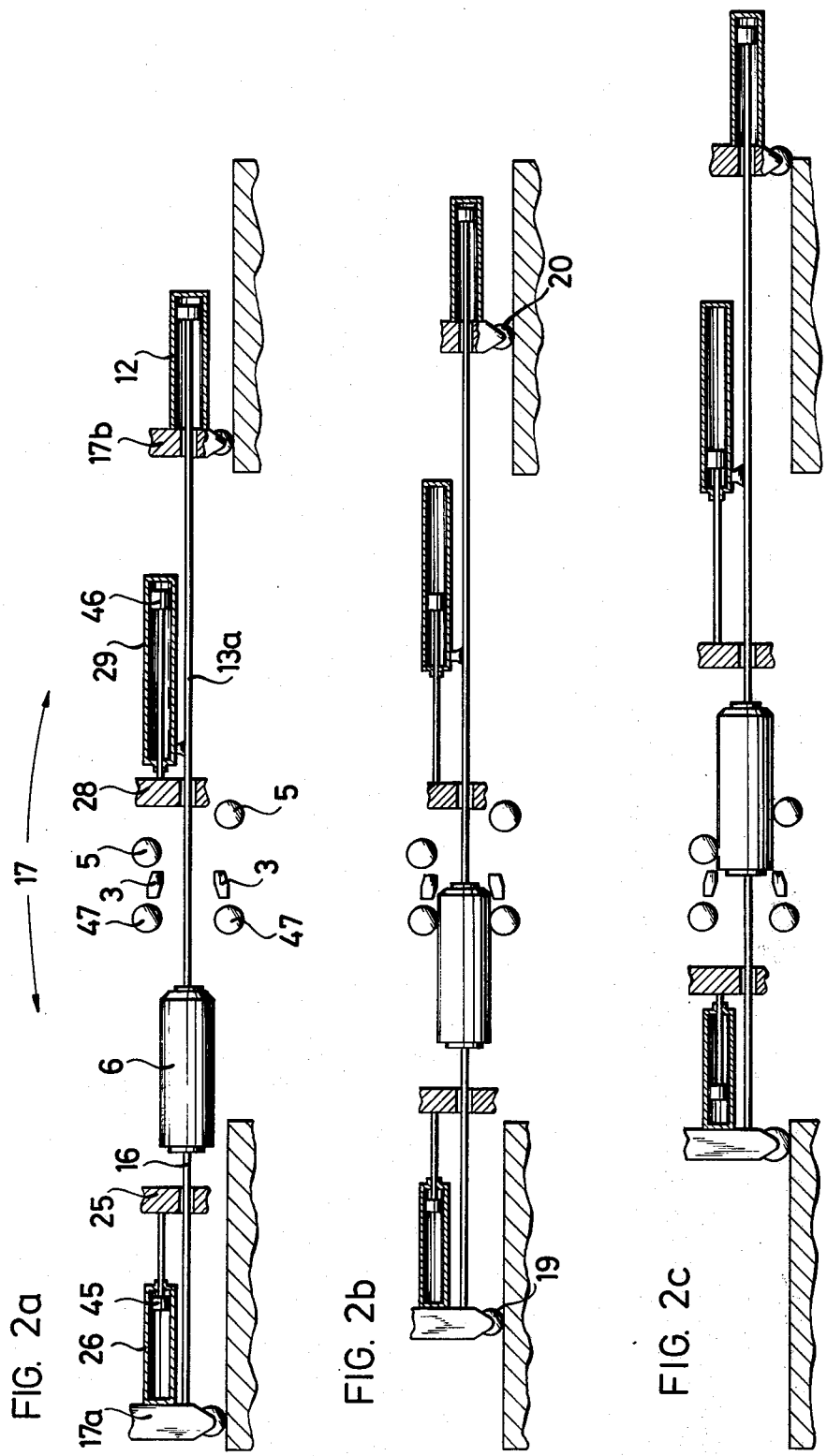
FIGS. 2a, 2b and 2c are somewhat diagrammatic representations showing successive stages of operation of an apparatus constructed in accordance with the present application.

The general operation of the apparatus is generally shown with respect to FIGS. 2a, 2b and 2c. The condition of the apparatus is shown in FIGS. 1 and 2a preparatory to feeding a workpiece 6 through the cutters 3. The entire clamping carriage 17 is moved longitudinally to the right with the workpiece 6 being carried and supported thereby, and being guided between the peeling cuttters 3. The workpiece 6 is firmly clamped between the opposite clamping devices defined by the bar 16 and the piston rod 13a which are substantially smaller in diameter than the workpiece and firmly engage its end faces. The clamping devices are projectable through the cutter head as shown with respect to the piston rod 13a in FIG. 2a and as partly shown for the clamping bar 16 in FIG. 2c. During the initial movement of the clamping carriage which carries the workpiece 6 therewith, the infeed support bearing 25 moves along with the clamping carriage and maintains its fixed location relative to the trailing end of the workpiece 6. At this time, the output support bearing 28 is stationary immediately behind the output guide rollers 5 associated with the plane of the cutter head. The infeed support bearing 25 moves along with the workpiece 6 as it begins traveling through the cutter head until the trailing end of the workpiece approaches the cutter head or the rollers 47. At that time, movement of the infeed support bearing 25 stops by operation of the actuating means defined by the hydraulic cylinder 26. In effect, operation of the hydraulic cylinder 26 moves the infeed support bearing 25 to the left at the same velocity that the clamping carriage is moving to the right so that the net effect is to make the support bearing 25 stationary while the workpiece 6 continues to travel through the cutter head. The rails 8 and the clamping bar 16 then slide longitudinally relative to the support bearing 25 as the clamping carriage and workpiece continue traveling to the right. The piston 45 of the cylinder 26 moves to the left in FIGS. 2a, 2b and 2c for effectively stopping movement of the support bearing 25 to the right. When the leading end of the workpiece 6 leaves the cutter head or the guide rollers 5 in the workpiece feed direction, the support bearing 28 begins to move to the right at the same speed as the workpiece 6 and the clamping carriage. Therefore, the support bearing 28 supports the workpiece 6 and the clamping device defined by the piston rod 13a closely adjacent to the leading end of the workpiece 6. While the clamping carriage and the piston rod 13a are moving to the right in the Figures, the piston 46 of the hydraulic cylinder 29 is moving to the left at the same velocity to effectively hold the support bearing 28 stationary relative to the cutter head and the apparatus housing. As soon as the leading end of the workpiece 6 exits from the cutter head and approaches the support bearing 28, movement of the piston 46 relative to the cylinder 29 stops so that the workpiece 6 and the support bearing 28 move together to the right at the same velocity until the workpiece 6 has completely passed through the cutter head. While the workpiece 6 is being peeled, it is also held by the stationary guide rollers 5 and 47. The return movement of the apparatus generally from the position shown in FIG. 2c back to the position shown in FIG. 2c simply occurs in the reverse sequence. After the clamping carriage 17 has returned to the left, the finished peeled workpiece 6 is placed back onto the grid 51 for discharge from the apparatus.

In the arrangement shown and described, it will be recognized that the peeling apparatus 1 can broadly be considered an apparatus for performing work on workpieces and the cutter head 4 may be considered a work station at which work is performed on workpieces passing longitudinally therethrough. The bar 16 and the piston rod 13a define opposed clamping means for clamping against opposite ends of a workpiece. These defined clamping means are extendable through the work station from opposite sides thereof for supporting and carrying the workpiece completely through the work station. Support bearings 25 and 28 define support means on opposite sides of the work station defined by the cutter head 4 for supporting the opposed clamping means. These defined support means are selectively movable toward and away from the work station relative to the opposed clamping means for maintaining the supports as close as possible to the end faces of the workpiece.

While there has been described what at present is considered to be the preferred embodiment of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. Apparatus for peeling elongated workpieces, including a rotary cutter head adapted to receive workpieces therethrough; opposed elongated clamping and workpiece carrying devices adapted for clamping against opposite ends of the workpieces, first actuating means for moving said claimping devices, said clamping devices being dimensioned for passing through said cutter head while concurrently supporting and carrying the workpiece, the improvement comprising, movable support means mounted in vibration damping relationship to said clamping devices, said support means having at least one inner member in constant, radial, contact with one of said clamping devices to absorb vibratory energy; and second actuating means engaging said support means for moving said support means toward and away from said cutter head for maintaining said support means close to the opposite ends of the workpiece to minimize the length of the clamping devices extending between said support means and the opposite ends of the workpiece.

2. The peeling apparatus of claim 1 wherein said support means includes a generally cylindrical bearing and hydrostatic support devices between said cylindrical bearing and said clamping devices.

3. The peeling apparatus of claim 2, wherein said support means includes a cylindrical sleeve mounted about said bearing.

4. The peeling apparatus of claim 3, and hydrostatic support devices between said bearing and said sleeve.

5. The peeling apparatus of claim 3, and fluid actuating means engaging said bearing for axially moving said bearing.

6. The peeling apparatus of claim 2, and movable piston means radially disposed within said cylindrical bearing.

7. The peeling apparatus of claim 6, wherein said piston means is biased against said clamping devices.

8. The peeling apparatus of claim 7, wherein the direction of the bias exerted by the piston is generally perpendicular to the direction of axial movement of said clamping devices.

9. The peeling apparatus of claim 1 wherein said clamping devices form part of a longitudinally movable clamping carriage having elongated rails and said support means is mounted on said rails for movement relative thereto toward and away from said cutter head.

10. The peeling apparatus of claim 1 including hydrostatic actuating means for moving said support means.

11. The peeling apparatus of claim 10 wherein said clamping devices form part of a longitudinally movable clamping carriage and said actuating means for said support means is carried by said carriage.

12. The peeling apparatus of claim 11 wherein said actuating means for said support means comprises hydraulic cylinders.

13. The peeling apparatus of claim 1 wherein said support means includes infeed and output support bearings respectively located on workpiece infeed and output sides of said cutter head and said clamping devices form part of a longitudinally movable clamping carriage, said infeed support bearing being disposed to be movable with said carriage until a workpiece has substantially moved through said cutter head whereupon said infeed support bearing is substantially stationary during further movement of said carriage, said output support bearing being disposed to be substantially stationary during initial movement of the workpiece through said cutter head and movable with said carriage when the workpiece exits from said cutter head.

14. Apparatus for performing work on workpieces comprising a work station for performing work on a workpiece passing longitudinally therethrough, opposed elongated clamping and workpiece carrying means, first actuating means for moving said clamping means: said claimping means being adapted for clamping against opposite ends of the workpiece and being dimensioned for passing through said work station while concurrently supporting and carrying a workpiece completely through said work station, support means on opposite sides of said work station in radial engagement with said clamping means for supporting said opposed clamping means in vibration dampening relationship, second actuating means for moving said support means; said support means being selectively movable toward and away from said work station relative to said opposed clamping means and includes infeed and output support on opposite sides of said work station, said infeed support being movable with a workpiece until the trailing end of the workpiece approaches said work station whereupon said infeed support is stationary during further movement of the workpiece through said work station, said output support being stationary during movement of the workpiece into said work station and being movable with the workpiece when the leading end of the workpiece exits from said work station.

15. The apparatus of claim 14 wherein said support means includes hydrostatic support devices urged transversely into engagement with said clamping means.

* * * * *